United States Patent [19]

Shibata

[11] Patent Number: 5,635,435

[45] Date of Patent: Jun. 3, 1997

[54] DIELECTRIC CERAMIC COMPOSITIONS

[75] Inventor: Masamitsu Shibata, Kyoto, Japan

[73] Assignee: Murata Manufacturing Co., Ltd., Japan

[21] Appl. No.: 634,150

[22] Filed: Apr. 19, 1996

[30] Foreign Application Priority Data

Apr. 26, 1995 [JP] Japan ................... 7-102338

[51] Int. Cl.⁶ .............. C04B 35/46; C03C 14/00
[52] U.S. Cl. ............................ 501/138; 501/139
[58] Field of Search .................. 501/138, 139, 501/32

[56] References Cited

U.S. PATENT DOCUMENTS

| | | | |
|---|---|---|---|
| 4,713,726 | 12/1987 | Sasazawa | 501/138 |
| 4,753,906 | 6/1988 | Nishigaki et al. | 501/139 |
| 5,264,402 | 11/1993 | Sano et al. | 501/138 |
| 5,350,721 | 9/1994 | Abe et al. | 501/138 |
| 5,432,136 | 7/1995 | Shibata et al. | 501/138 |

FOREIGN PATENT DOCUMENTS

| | | |
|---|---|---|
| 0169636 | 1/1986 | European Pat. Off. |
| 0534802 | 3/1993 | European Pat. Off. |
| 0637041 | 2/1995 | European Pat. Off. |
| 4215638 | 11/1992 | Germany. |

*Primary Examiner*—Deborah Jones
*Attorney, Agent, or Firm*—Ostrolenk, Faber, Gerb & Soffen, LLP

[57] ABSTRACT

A dielectric ceramic composition having about 97.5 to 99.95 wt % of a main component and 0.05 to 2.5 wt % of a first subcomponent, the main component having the following general formula:

$$\{100-(a+b+c+d+e)\}BaTiO_3 + aBi_2O_3 + bNb_2O_5 + cMxO + dMyO_2 + eMz,$$

wherein Mx is at least one element selected from the group consisting of Mg, Ca and Zn; My is at least one element selected from the group consisting of Ti, Sn and Zr; Mz is at least one oxide of an element selected from the group consisting of Y, La, Ce, Pr, Nd, Sm, Dy, Ho and Er; and a, b, c, d, and e are mole % and are in the following ranges: $1.0 \leq a \leq 6.0$, $0.5 \leq b \leq 4.5$, $0 \leq c \leq 4.0$, $1.5 \leq d \leq 15.0$, and $0.5 \leq e \leq 5.5$; and the first subcomponent comprising a glass mainly containing $SiO_2$. The composition can be subjected to firing at 1,160° C. or less; satisfies the X8R characteristic of the EIA standard in spite of a high dielectric constant of 1,000 or more; and exhibits a small change rate of the electrostatic capacitance toward the temperature when a bias dc voltage is applied thereto.

10 Claims, No Drawings

DIELECTRIC CERAMIC COMPOSITIONS

BACKGROUND OF THE INVENTION

1. Field of the Invention

The present invention relates to a dielectric ceramic composition, and in particular, relates to a dielectric ceramic composition used as a material for a monolithic ceramic capacitor or the like.

2. Description of the Related Art

Conventionally, dielectric ceramic compositions in the field of the invention and in which the main component is $BaTiO_3$ and the subcomponents are a bismuth compound, e.g., $Bi_2O_3$—$TiO_2$, $Bi_2O_3$—$SnO_2$, and $Bi_2O_3$—$ZrO_2$, and a rare earth metal oxide, are widely known to exhibit a small temperature dependence of its characteristics such as dielectric constant, mechanical strength and stability of the dielectric constant over wide temperature ranges.

It is also reported that another dielectric ceramic composition of which the main component is $BaTiO_3$ and the subcomponents are $Nb_2O_3$, a rare metal oxide, and an oxide of a transition metal, e.g., Cr, Mn, Fe, Co and Ni, has a flat temperature characteristic of the dielectric constant while having the high dielectric constant of 3,000 or more.

The temperature characteristic of those dielectric ceramic compositions satisfy the X7R characteristic of the EIA standard, i.e. the percentage of capacitance change in a temperature range of −55° C. to +125° C. is limited within ±15% on the basis of the reference electrostatic capacitance at 25° C.

Recently, ceramic monolithic capacitors have been applied to the EEC modules which electronically control an automobile's engine. These modules are implemented in an engine room in which, when the engine operates, the temperature ranges from approximately −20° C. in winter to approximately +130° C. in summer. Further, the temperature is likely to rise to approximately +150° C. if the engine becomes overheated. Thus, conventional dielectric ceramic compositions satisfying only the X7R characteristic cannot be employed.

The dielectric ceramic composition in which the main component is $BaTiO_3$ and the subcomponents are $Nb_2O_3$, a rare metal oxide and an oxide of a transition metal, e.g., Cr, Mn, Fe, Co and Ni, exhibits relatively small mechanical strength. Moreover, the physical characteristics of these compositions, such as dielectric constant, largely depend on the applied voltage. Accordingly, small-sized ceramic monolithic capacitors with high capacitance cannot be attained using a thin film of the dielectric composition.

Further, although the dielectric ceramic compositions having $BaTiO_3$ as a main component and a bismuth compound as a subcomponent exhibit low dependence of their physical characteristics on the applied electric voltage and a high mechanical strength, the dependence of the dielectric constant on temperature becomes larger when the dielectric constant of the composition is made to be high. Moreover, to use those dielectric ceramic compositions for monolithic ceramic capacitors, it is necessary to increase the amount of Pb in the material which forms internal electrodes because the required firing temperature is 1,160° C. or more. Such internal electrodes are high in cost. In addition, the reaction between Pd and $Bi_2O_3$ increases.

SUMMARY OF THE INVENTION

In accordance with the present invention, it is intended to provide a dielectric ceramic composition, which can be fired at 1,160° C. or less; has a high dielectric constant of 1,000 or more; satisfies the X8R characteristic of the EIA standard, i.e. the change of the electrostatic capacitance ("TC") in a temperature range of −55° C. to +150° C. is limited within ±15% on the basis of the reference electrostatic capacitance at 25° C.; exhibits a high mechanical strength; and shows small bias TC which is defined as the change of electrostatic capacitance when a dc voltage having a half magnitude of the rated voltage is applied to a film of the dielectric ceramic composition of 10 to 15μ thick in accordance with the Japanese Industrial Standard ("JIS") C6429 for the RB characteristic, as small as from +15% to −40% in the above-temperature range.

According to the present invention, what is provided is a dielectric ceramic composition comprising about 97.5 to 99.95 wt % of a main component and about 0.05 to 2.5 wt % of a subcomponent;

the main component having the following general formula:

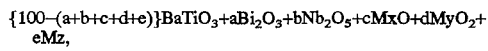

wherein Mx is at least one element selected from the group consisting of Mg, Ca and Zn; My is at least one element selected from the group consisting of Ti, Sn and Zr; Mz is at least one oxide of a rare earth element selected from the group consisting of Y, La, Ce, Pr, Nd, Sm, Dy, Ho and Er; and a, b, c, d, and e are mole % and are in the following ranges; $1.0 \leq a \leq 6.0$, $0.5 \leq b \leq 4.5$, $0 \leq c \leq 4.0$, $1.5 \leq d \leq 15.0$, and $0.5 \leq e \leq 5.5$; and a first subcomponent comprising a glass mainly containing $SiO_2$, i.e., the silica is present in the greatest amount of all of the glass components.

In accordance with the another aspect of the present invention, it is intended to provide a dielectric ceramic composition comprising about 97.0 to 99.94 wt % of a main component, about 0.05 to 2.5 wt % of a first subcomponent, and about 0.01 to 0.5 wt % of a second subcomponent;

the main component having the following general formula:

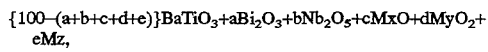

wherein Mx is at least one element selected from the group consisting of Mg, Ca and Zn; My is at least one element selected from the group consisting of Ti, Sn and Zr; Mz is at least one oxide of a rare earth metal element selected from the group consisting of Y, La, Ce, Pr, Nd, Sm, Dy, Ho and Er; and a, b, c, d, and e are mole % and are in the following ranges; $1.0 \leq a \leq 6.0$, $0.5 \leq b \leq 4.5$, $0 \leq c \leq 4.0$, $1.5 \leq d \leq 15.0$, $0.5 \leq e \leq 5.5$; and the first subcomponent comprising a glass mainly containing $SiO_2$;

and the second subcomponent comprising at least one oxide of an element selected from the group consisting of Cr, Mn, Fe, Co and Ni.

BaO—SeO—CaO—$Li_2O$—$SiO_2$ is an example of the glass mainly containing $SiO_2$, which glass is the first subcomponent and is used as a sintering aid for reducing the firing temperature to 1,160° C. or less. Other kinds of oxide glass, such as a BaO—$Li_2O$—$B_2O_3$—$SiO_2$ glass containing boron oxide, may be used instead. Further, non-oxide glass, such as an $SiO_2$—B4C glass, may be employed. When the glass contains boron oxide and aqueous forming binders are employed for the ceramic material, it is preferred to use B4C, which is stable to water, as the material for the boron oxide.

In accordance with the present invention, the dielectric ceramic composition can be fired at a low temperature of 1,160° C. or less and the TC thereof is satisfactorily maintained within 15% over a wide temperature range of from −55° C. to 150° C., indicating a flat temperature characteristic. Thus, monolithic ceramic capacitors including the ceramic compositions can be applied to electrical machinery and apparatuses employed in places where there are great temperature changes.

Moreover, since the ceramic composition has excellent mechanical strength, the occurrence of cracking or chipping of a ceramic part mounted on a printed circuit board is prevented.

Further, the small bias TC allows the dielectric ceramic layer to be as thin as from 10 to 15 mm. Therefore, the ceramic monolithic capacitors can be prepared smaller in size and larger in capacitance.

The above and other objects, features and advantages of the present invention will be better understood from the following detailed description of the preferred embodiments.

DETAILED DESCRIPTION OF THE PREFERRED EMBODIMENTS

The main component of the dielectric ceramic composition was prepared as follows.

As the starting materials, the following industrial materials were employed: $BaTiO_3$; $Bi_2O_3$; $Nb_2O_5$; MxO, wherein Mx is Mg, Ca or Zn; $MyO_2$, wherein My is Ti, Sn or Zr; and Mz which is an oxide of Y, La, Ce, Pr, Nd, Sm, Dy, Ho or Er. Those starting materials were combined in amounts to satisfy the composition ratio shown in Table 1, subjected to wet grinding in a ball mill for 16 hours while blending, and dried by evaporation to give a powder mixture. The obtained powder mixture was calcinated in a zirconium container in air at 1,000° C. for 2 hours, and then was ground to pass through a 200 mesh sieve. In this way, a raw powder of the main component of the ceramic composition was obtained.

The first subcomponent of the dielectric ceramic composition was prepared as follows.

In the present embodiment, an oxide glass having the composition of $8BaO$—$6SrO$—$6CaO$—$30Li_2O$—$50SiO_2$ (mol %) was used as the first subcomponent to control the firing temperature to 1,160° C. or less. As the starting materials, the following industrial materials were employed: $BaCO_3$, $SrCO_3$, $CaCO_3$, $Li_2O$ and $SiO_2$. Those starting materials were combined in amounts to satisfy the foregoing composition ratio, subjected to wet grinding in a ball mill for 16 hours while blending, and dried by evaporation to obtain a powder mixture. The obtained powder mixture was placed in an aluminum melting pot at 1,300° C. for 1 hour and abruptly quenched to vitrify the glass and then ground to pass through a 200 mesh sieve. In this way, a raw powder of the first subcomponent of the ceramic composition was obtained. It was then added to the raw powder of the main component in the weight ratio shown in Table 2.

The second subcomponent of the dielectric ceramic composition was prepared as follows.

As the starting materials, the following industrial materials were employed: $Cr_2O_3$, $MnO_2$, $Fe_2O_3$, $Co_2O_3$ and NiO. To satisfy the composition ratio shown in Table 3, the second subcomponent was added to the main component having the composition of 83.5 $BaTiO_3$—4.5$Bi_2O_3$—1.0$Nb_2O_5$—1.0CaO—1.0ZnO—6.0$TiO_2$—0.5$SnO_2$—0.5$ZrO_2$—2.0$Nd_2O_3$—1.0 $Dy_2O_3$ (mole %) and to which 1.0 wt % of the first subcomponent had been added. The ceramic composition shown in Table 3 indicates the combined amount of the main component and the first subcomponent.

Polyvinylbutyral binders and an organic solvent, such as toluene and ethyl alcohol, were added to the resulting material, including the main, the first subcomponents, and the second subcomponents. The mixture was subjected to wet grinding in a ball mill for 16 hours while blending and was shaped into sheets by the doctor blade process to give green sheets 19 mm thick. After internal electrode patterns were printed using a Ag/Pd (70/30 wt %) paste on the green sheets, six green sheets and a dummy sheet were laminated and thermally-compressed to give a laminated product. A compact of 5.5 mm by 4.5 mm by 1 mm was cut from the laminated product. The compact was then was fired at a temperature shown in Tables 4 and 5 for 2 hours to obtain a 13 mm thick sintered body.

Finally, a monolithic capacitor was prepared by baking a silver electrode onto the end surface of the sintered body, and the dielectric constant ($\epsilon$) at room temperature, dielectric loss (tan $\delta$), TC, and the bias TC thereof were measured.

The dielectric constant ($\epsilon$) and the dielectric loss (tan $\delta$) were measured at 25° C., 1 KHz and 1 Vrms.

The maximum TC ($\Delta C_{max}$) which was the maximum change of the capacitance between −55° C. and 150° C. was measured on the basis of the reference electrostatic capacitance at 25° C.

The maximum bias TC ($\Delta C_{maxB}$) was measured in such a way that the electrostatic capacitance thereof was measured in the above temperature range on the basis of a reference electrostatic capacitance at 25° C. at 0 V.

The anti-flexure strength of the ceramic was measured by the three-point flexure test, as follows:

Each of the materials corresponding to the compositions shown in Tables 1, 2 and 3 was formed into sheets and pressed to form a laminated product. A compact of 35 mm by 7 mm by 1.2 mm was cut from the laminated product. After that, the resulting compact was baked for 2 hours at the corresponding baking temperature shown in Tables 4 and 5 to provide a ceramic strip. The anti-flexure strength of each composition was evaluated as the mean value of twenty samples.

Table 4 shows the result of the measurements of the compositions according to Tables 1 and 2, and Table 5 shows that of the compositions according to Table 3.

In the Tables, samples marked with an asterisk (*) are outside the scope of the invention.

TABLE 1

| Sample No. | 100- (a + b + c + d + e) | a | b | c | | | d | | | e | |
|---|---|---|---|---|---|---|---|---|---|---|---|
| | | | | MgO | CaO | ZnO | TiO$_2$ | SnO$_2$ | ZrO$_2$ | Y$_2$O$_3$ | La$_2$O$_3$ |
| 1 | 82.5 | 3.5 | 1.5 | 0 | 2 | 0 | 8.5 | 0.5 | 0.5 | 0 | 0 |
| 2 | 85.5 | 1 | 4 | 0.5 | 1 | 1.5 | 2 | 1.5 | 0 | 0.5 | 1 |
| 3 | 79 | 4.5 | 2.5 | 1 | 0 | 3 | 5 | 0 | 2 | 0 | 0 |
| 4 | 85 | 4 | 2 | 0 | 0 | 1 | 4 | 1 | 1 | 0.5 | 0 |
| 5 | 78 | 5.5 | 0.5 | 1 | 0 | 0 | 12 | 0.5 | 1.5 | 0 | 0.5 |
| 6 | 83 | 2.5 | 3 | 0 | 1.5 | 1 | 3.5 | 0.5 | 0 | 1.5 | 0 |
| 7 | 74 | 6 | 1.5 | 0 | 3.5 | 0 | 12 | 0 | 0.5 | 0 | 1 |
| 8 | 74 | 3.5 | 2 | 1 | 1.5 | 0.5 | 9 | 2 | 2 | 0 | 1 |
| *9 | 87.7 | 0.8 | 2.5 | 1 | 1 | 1 | 2 | 1 | 0.5 | 0.5 | 0 |
| *10 | 72.8 | 6.2 | 4 | 0.5 | 1 | 0 | 11 | 1 | 2 | 0 | 0 |
| *11 | 82.2 | 3.5 | 0.3 | 0 | 0 | 2.5 | 7 | 2 | 0 | 0 | 0 |
| *12 | 84.8 | 2 | 4.7 | 1 | 0 | 0.5 | 2 | 1.5 | 0.5 | 0 | 0 |
| *13 | 72.8 | 3 | 4 | 0 | 3 | 1.2 | 12 | 1 | 1 | 0 | 1 |
| *14 | 87.2 | 3.5 | 2.5 | 0 | 1 | 1 | 1.5 | 0.5 | 0.3 | 0 | 0 |
| *15 | 75.3 | 4.5 | 2.5 | 0.5 | 0 | 0 | 11 | 3.2 | 1 | 0 | 0.5 |
| *16 | 79.2 | 5 | 3 | 0 | 0 | 0 | 11.5 | 0 | 1 | 0 | 0.3 |
| *17 | 82.3 | 2.5 | 1.5 | 0.5 | 0.5 | 1 | 5 | 1 | 0 | 1.5 | 0 |
| *18 | 81.5 | 4 | 2 | 0 | 0 | 1.5 | 8.5 | 0 | 0 | 0 | 0 |
| *19 | 75 | 3.5 | 2.5 | 0.5 | 1.5 | 1 | 11 | 0.5 | 2.5 | 0 | 0 |

| Sample No. | 100 - (a + b + c + d + e) | e | | | | | | |
|---|---|---|---|---|---|---|---|---|
| | | CoO$_2$ | Pr$_5$O$_{11}$ | Nd$_2$O$_3$ | Sm$_2$O$_3$ | Dy$_2$O$_3$ | Ho$_2$O$_3$ | Er$_2$O$_3$ |
| 1 | 82.5 | 0 | 0 | 1 | 0 | 0 | 0 | 0 |
| 2 | 85.5 | 0 | 0 | 0.5 | 0 | 1 | 0 | 0 |
| 3 | 79 | 0.5 | 0 | 0.5 | 0 | 0 | 1 | 0 |
| 4 | 85 | 0 | 0.5 | 0 | 1 | 0 | 0 | 1 |
| 5 | 78 | 0 | 0 | 0 | 0.5 | 0 | 0 | 0.5 |
| 6 | 83 | 1.5 | 0 | 0 | 1 | 0 | 0 | 0 |
| 7 | 74 | 0 | 0 | 1 | 0 | 0.5 | 0 | 0 |
| 8 | 74 | 0.5 | 0.5 | 1 | 0.5 | 0 | 1 | 0.5 |
| *9 | 87.7 | 0.5 | 0 | 0.5 | 1 | 0.5 | 0 | 0 |
| *10 | 72.8 | 1 | 0 | 0 | 0 | 0 | 0 | 0 |
| *11 | 82.2 | 0 | 2 | 0 | 0.5 | 0 | 0 | 0.5 |
| *12 | 84.8 | 2 | 0 | 0 | 0 | 0 | 0 | 0 |
| *13 | 72.8 | 0 | 0 | 0 | 0 | 1 | 1 | 0 |
| *14 | 87.2 | 0 | 1.5 | 0 | 0 | 0 | 0 | 0 |
| *15 | 75.3 | 0 | 0 | 1.5 | 0 | 0 | 0 | 0 |
| *16 | 79.2 | 0 | 0 | 0 | 0 | 1 | 0 | 0 |
| *17 | 82.3 | 0.5 | 0.7 | 1 | 0 | 0 | 0 | 0 |
| *18 | 81.5 | 1.5 | 0 | 0 | 1 | 0 | 0 | 1 |
| *19 | 75 | 2 | 0 | 0 | 0 | 0 | 0 | 0 |

TABLE 2

| Sample No. | Main Component Wt % | First Subcomponent Wt % |
|---|---|---|
| 1 | 99 | 1 |
| 2 | 9 | 2 |
| 3 | 99.5 | 0.5 |
| 4 | 99 | 1 |
| 5 | 98.5 | 1.5 |
| 6 | 99.5 | 0.5 |
| 7 | 98 | 2 |
| 8 | 98 | 2 |
| *9 | 99 | 1 |
| *10 | 99.5 | 0.5 |
| *11 | 98 | 2 |
| *12 | 99.5 | 0.5 |
| *13 | 99 | 1 |
| *14 | 99 | 1 |
| *15 | 99 | 1 |
| *16 | 99.5 | 0.5 |
| *17 | 100 | 0 |
| *18 | 99.97 | 0.03 |
| *19 | 97.3 | 2.7 |

TABLE 3

| Sample No. | Main Component | Second Subcomponent Wt % | | | | |
|---|---|---|---|---|---|---|
| | | Cr | Mn | Fe | Co | Ni |
| 21 | 99.99 | 0 | 0.01 | 0 | 0 | 0 |
| 22 | 99.85 | 0.05 | 0.05 | 0.5 | 0 | 0 |
| 23 | 99.95 | 0 | 0 | 0 | 0.05 | 0 |
| 24 | 99.9 | 0.05 | 0 | 0 | 0 | 0.05 |
| 25 | 99.85 | 0 | 0.1 | 0 | 0 | 0.05 |
| 26 | 99.65 | 0.05 | 0.2 | 0.05 | 0.05 | 0 |

TABLE 3-continued

| Sample No. | Main Component | Second Subcomponent Wt % | | | | |
|---|---|---|---|---|---|---|
| | | Cr | Mn | Fe | Co | Ni |
| 27 | 99.6 | 0 | 0.3 | 0 | 0 | 0.1 |
| 28 | 99.55 | 0 | 0.3 | 0 | 0.1 | 0.05 |
| 29 | 99.5 | 0.1 | 0.3 | 0 | 0.1 | 0 |
| *30 | 99.45 | 0 | 0.35 | 0.05 | 0.1 | 0.05 |

TABLE 4

| Sample No. | Firing Temp. °C. | Electric Characteristics | | | | Mechanical Characteristics kg/cm$^2$ |
|---|---|---|---|---|---|---|
| | | $\epsilon$ | tan $\delta$ % | TC $|\Delta C/C|_{max}$ % | TC $|\Delta C/C|_{maxB}$ % | |
| 1 | 1140 | 1910 | 1.3 | 11.5 | 33.5 | 2060 |
| 2 | 1100 | 1800 | 1.4 | 12.1 | 30.0 | 2400 |
| 3 | 1100 | 1680 | 1.4 | 9.5 | 31.0 | 2180 |
| 4 | 1160 | 1900 | 1.2 | 12.0 | 31.5 | 1900 |
| 5 | 1120 | 1650 | 1.4 | 10.5 | 33.0 | 2200 |
| 6 | 1080 | 1250 | 1.2 | 6.5 | 28.5 | 2310 |
| 7 | 1100 | 1480 | 1.2 | 14.5 | 33.0 | 2100 |
| 8 | 1140 | 1630 | 1.5 | 13.5 | 31.5 | 2130 |
| 9 | 1160 | 1580 | 2.1 | 17.2 | 33.8 | 1470 |
| *10 | 1120 | 980 | 1.3 | 21.5 | 28.0 | 2050 |
| *11 | 1140 | 1620 | 1.7 | 23.0 | 41.0 | 2210 |
| *12 | 1100 | 2220 | 1.1 | 18.2 | 42.5 | 2300 |
| *13 | 1100 | 1710 | 1.8 | 22.5 | 31.0 | 2260 |
| *14 | 1140 | 1320 | 1.9 | 16.2 | 34.0 | 2000 |
| *15 | 1150 | 1450 | 1.3 | 29.3 | 35.5 | 1970 |
| *16 | 1120 | 1300 | 1.8 | 24.1 | 43.0 | 1800 |
| *17 | 1100 | 1590 | 1.1 | 22.1 | 35.2 | 2350 |
| *18 | 1160 | Not Sintered at 1160° C. | | | | |
| *19 | 1080 | 990 | 1.0 | 11.2 | 29.4 | 2150 |
| 20 | 1120 | 2000 | 1.3 | 12.1 | 33.0 | 2060 |
| 21 | 1120 | 1920 | 1.4 | 12.0 | 33.3 | 2020 |
| 22 | 1120 | 2010 | 1.4 | 13.0 | 34.2 | 1980 |
| 23 | 1120 | 1980 | 1.3 | 12.0 | 33.0 | 2050 |
| 24 | 1120 | 2050 | 1.4 | 13.0 | 34.0 | 2100 |
| 25 | 1120 | 1890 | 1.4 | 12.2 | 33.0 | 2120 |
| 26 | 1120 | 1920 | 1.7 | 12.5 | 32.8 | 2110 |
| 27 | 1120 | 1950 | 1.8 | 11.9 | 34.5 | 2130 |
| 28 | 1120 | 1890 | 2.0 | 13.2 | 34.8 | 1970 |
| 29 | 1120 | 1920 | 2.3 | 12.6 | 35.0 | 1980 |
| *30 | 1120 | 1800 | 2.6 | 12.2 | 35.0 | 1980 |

The preferable range of the amounts of the main component, the first subcomponent, and the second subcomponent are explained below.

With respect to the main component, the a value which represents $Bi_2O_3$ mole % is preferably in a range of from about 1.0 to 6.0 mole %, and most preferably about 2.5 to 5.5%. The absolute value of the maximum TC ($\Delta C_{max}$) exceeds 15% and the anti-flexure strength is as small as 1,500 kg/cm$^2$ or less when the a value is less than 1.0 mole %, as shown in sample 9, while the maximum TC ($\Delta C_{max}$) exceeds 15% and the dielectric constant ($\epsilon$) is less than 1,000 when the a value is more than 6.0 mole %, as shown in sample 10.

In addition, the b value which represents $Nb_2O_5$ mole % is preferably in a range of from about 0.5 to 4.5 mole %, and most preferably about 1.5 to 4%, because the maximum TC ($\Delta C_{max}$) exceeds –15% and the maximum bias TC ($\Delta C_{maxB}$) exceeds –40% when the b value is less than 0.5 mole % or more than 4.5 mole %, as respectively shown in samples 11 and 12.

Further, the c value which represents MxO mole % is preferably in a range of from about 0 to 4.0 mole %, and most preferably about 1 to 3.5%, because the maximum TC ($\Delta C_{max}$) exceeds –15% when the c value is more than 4.0 mole %, as shown in sample 13, while a high dielectric constant ($\epsilon$) can be obtained even if c value is 0 mole %, as shown in sample 5.

The d value which represents $MyO_2$ mole % is preferably in a range of from about 1.5 to 15.0 mole %, and most preferably about 3.5 to 14%, because the maximum TC ($\Delta C_{max}$) exceeds –15% when the d value is less than 1.5 mole % or more than 15.0 mole %, as respectively shown in samples 14 and 15.

The e value which represents Mz mole % is preferably in a range of from about 0.5 to 5.5 mole %, and most preferably about 1 to 5%, because the maximum TC ($\Delta C_{max}$) exceeds 15% and the maximum bias TC ($\Delta C_{max}$) exceeds –40% when the e value is less than 0.5 mole %, as shown in sample 16, and the maximum TC ($\Delta C_{max}$) exceeds –15% when the e value is more than 5.5 mole %, as shown in sample 17.

With respect to the first subcomponent, the content thereof is preferably in a range of from about 0.05 to 2.5 wt %, and most preferably about 0.5 to 2%. This is because the firing temperature exceeds 1,160° C. when the content is less than 0.05 wt %, as shown in sample 18, while the dielectric constant ($\epsilon$) was less than 1,000 when the content was more than 2.5 wt %, as shown in sample 19.

With respect to the second subcomponent, it was used to prevent the dielectric ceramic from being reduced. The content of the second subcomponent is preferably in the range of from about 0.01 to 0.5 wt %, and most preferably about 0.1 to 0.4%. This is because reduction cannot be prevented effectively if the content is less than 0.01 wt %, while the dielectric loss (tan $\delta$) exceeds 2.5% when the content is more than 2.5 wt %, as shown in sample 30.

In the foregoing examples, the first sub- component premixed according to a prescribed composition ratio was subjected to a high temperature in order to be melted and then ground to give a glass powder. The resulting glass powder was added to the main component of the ceramic composition. The first subcomponent may also be added to the main component as a modified material obtained by heating, but not melting, the starting materials premixed according to a prescribed composition ratio. Moreover, each constitutional element of the first subcomponent may be separately added to the main component in an appropriate state, such as a metal alkoxide, and may be baked to become melted and vitrified.

In the foregoing examples, although the second subcomponent was added in an oxide form from the beginning, a material which changes to an oxide in the calcination or firing process, for example, a carbonate of each element, may be used as a starting material.

What is claimed is:

1. A dielectric ceramic composition comprising about 97.5 to 99.95 wt % of a main component and about 0.05 to 2.5 wt % of a first subcomponent comprising a glass mainly containing $SiO_2$, said main component having the following general formula

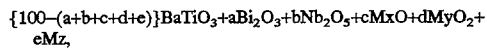
$$\{100-(a+b+c+d+e)\}BaTiO_3+aBi_2O_3+bNb_2O_5+cMxO+dMyO_2+eMz,$$

wherein

Mx is at least one element selected from the group consisting of Mg, Ca and Zn;

My is at least one metal selected from the group consisting of Ti, Sn and Zr;

Mz is at least one oxide of an element selected from the group consisting of Y, La, Ce, Pr, Nd, Sm, Dy, Ho and Er; and a, b, c, d, and e are mole % and are in the following ranges:
$1.0 \leq a \leq 6.0$
$0.5 \leq b \leq 4.5$
$0 \leq c \leq 4.0$
$1.5 \leq d \leq 15.0$
$0.5 \leq e \leq 5.5.$ 2. A dielectric ceramic composition according to claim 1 containing
$2.5 \leq a \leq 5.5$
$1.5 \leq b \leq 4$
$1 \leq c \leq 3.5$
$3.5 \leq d \leq 14$
$1 \leq e \leq 5.$ 3. A dielectric ceramic composition according to claim 2 containing about 0.5 to 2 wt % of said first subcomponent.

4. A dielectric ceramic composition according to claim 3 wherein at least one of Mx, My and Mz is a mixture of at least two members of the respective group.

5. A dielectric ceramic composition according to claim 4 further containing about 0.01 to 0.5 wt % of second subcomponent comprising at least one oxide of an element selected from the group consisting of Cr, Mn, Fe, Co and Ni.

6. A dielectric ceramic composition according to claim 5 containing about 0.1 to 0.4 wt % of said second subcomponent.

7. A dielectric ceramic composition according to claim 1 further containing about 0.01 to 0.5 wt % of second subcomponent comprising at least one oxide of an element selected from the group consisting of Cr, Mn, Fe, Co and Ni.

8. A dielectric ceramic composition according to claim 7 containing about 0.1 to 0.4 wt % of said second subcomponent.

9. A dielectric ceramic composition according to claim 3 further containing about 0.01 to 0.5 wt % of second subcomponent comprising at least one oxide of an element selected from the group consisting of Cr, Mn, Fe, Co and Ni.

10. A dielectric ceramic composition according to claim 9 containing about 0.1 to 0.4 wt % of said second subcomponent.

* * * * *